US005993926A

United States Patent [19]

Menahem

[11] Patent Number: 5,993,926

[45] Date of Patent: Nov. 30, 1999

[54] SUSPENSION SYSTEM ELEMENT AND METHOD FOR STORING PLASTIC SHEET MATERIAL

[76] Inventor: Shlomo Menahem, 39 Harav Kook Street, Hadera 38427, Israel

[21] Appl. No.: 08/958,114

[22] Filed: Oct. 27, 1997

[30] Foreign Application Priority Data

Jan. 9, 1997 [IL] Israel ........................................ 119987

[51] Int. Cl.$^{6}$ ........................................................ B32B 3/16

[52] U.S. Cl. ............................ 428/40.1; 40/391; 40/534; 428/41.7; 428/41.8; 428/42.1; 428/42.2; 428/42.3

[58] Field of Search ................................ 428/40.1, 42.1, 428/42.2, 42.3, 41.7, 41.8; 40/391, 534

[56] References Cited

U.S. PATENT DOCUMENTS

| | | | |
|---|---|---|---|
| 3,833,456 | 9/1974 | Redd | 428/42.2 |
| 3,885,070 | 5/1975 | Chapman | 428/42.2 |
| 4,400,899 | 8/1983 | Martinez | 40/391 |
| 4,514,919 | 5/1985 | Plutsky | 40/159 |

*Primary Examiner*—Nasser Ahmad
*Attorney, Agent, or Firm*—Wolf, Greenfield & Sacks, P.C.

[57] ABSTRACT

A suspension system for plastic sheet material comprising:

a base sheet; and a suspension element attached to said base sheet, said element including:

a first strip affixed to said base sheet and having an exposed adhesive release surface, a second strip hingedly mounted on said base sheet, proximate to said first sheet, and comprising an adhesive surface at least partially overlapping said adhesive release surface to enable said overlapping adhesive surface of said second strip to be easily lifted off said release surface of said first strip, whereby plastic sheet material inserted between said first and second strips, sticks to said adhesive surface of said second strip, thereby becoming hingedly attached to the base sheet and whereby, when said adhesive surface of said second strip is lifted off the plastic sheet material, the plastic sheet material is released from said base sheet and the adhesive surface of the second strip can be reused, since it overlaps the adhesive release surface of the first strip.

12 Claims, 4 Drawing Sheets

SUSPENSION SYSTEM ELEMENT AND METHOD FOR STORING PLASTIC SHEET MATERIAL

The present invention relates to a suspension system specifically adapted for storing and retrieving sheet film or plastic envelopes. The suspension system of this invention is particularly suited for filing different size sheet films and for screening them without having to take them out of the file.

BACKGROUND OF THE INVENTION

Suspension files have been used for a long time for filing, storing and retrieving various types of documents. These files generally comprise conventional filing envelopes or folders, to which have been added suspension means and possibly Indexing means for filing the suspension files in some organized fashion. Documents are held within the suspension files by means of flexible metal prongs which are threaded through holes in the document and bent over to hold the document in place. Sheet films, such as X-rays or film plates for printing, which are transparent and generally comprised of flexible plastic materials, are very inconveniently stored in suspension files. Usually such films must be stored in envelopes, since it is undesirable to make holes in the films themselves. Therefore, if one wishes to find a particular film, one has to take the films out of their envelopes or out of the folder for perusal in order to find what one is looking for, and this is very time consuming. Another problem with filing films or plastic envelopes is that these generally come in a variety of sizes, contrary to paper documents which are usually of fairly uniform dimensions. Photo films and other small sized films such as microfilms are usually stored in such manner that does not enable browsing while they are stored.

There thus is a great need for an orderly filing system for sheet films of varying dimensions which can easily be suspended, perused, taken out of and put back into a cabinet or other storage means.

SUMMARY OF THE INVENTION

It is the object of the present invention to provide a suspension system for sheet films and plastic envelopes and similar objects without making holes in them.

A further object of the invention is to provide a suspension element for holding, storing, and retrieving sheet film and plastic envelopes of varying dimensions in an orderly and easily retrievable manner.

Another object of the present invention is to provide a suspension element for holding and storing sheet film and plastic envelopes in a filing system so that they can easily be viewed without removing them from the file.

Yet another object of the present invention is to provide a suspension file comprising such a suspension element.

A still further object of the invention is to provide a method of storing and retrieving plastic sheet material.

In accordance with the invention there is thus provided a suspension system for plastic sheet material comprising:

a base sheet and a suspension element attached to the base sheet, the element including:

- a first strip attached to the base sheet and having an exposed adhesive release surface,
- a second strip hingedly mounted on the base sheet, proximate to the first strip and comprising an adhesive surface at least partially overlapping said adhesive release surface to enable the adhesive overlapping surface of the second strip to be easily lifted off the release surface of the first strip, whereby plastic sheet material inserted between the first and second strips sticks to the adhesive surface of the second strip, thereby becoming hingedly attached to the base sheet and whereby, when the adhesive surface of the second strip is lifted off the plastic sheet material, the plastic sheet material is released from the base sheet and the adhesive surface of the second strip can be reused, since it overlaps the adhesive release surface on the first strip.

According to a preferred embodiment, the base sheet has an associated suspension means for filing in a suspension filing system.

One embodiment of the present invention is characterized in that said second strip comprising an adhesive surface is semi-rigid or rigid.

In a preferred embodiment, the base sheet and/or the second strip include indexing means.

In a further preferred embodiment, the second strip comprising an adhesive surface includes tab means to assist lifting the strip off the adhesive release surface and plastic sheet material.

The base sheet of the suspension system may also comprise an envelope or pocket for holding documents. Moreover, in accordance with this invention, not only single plastic sheets, such as film sheets, can be stored on the base sheet, but also plastic envelopes. The plastic sheets or films that can be stored do not have to be uniform in size and different dimension films can be stored simultaneously on a single base sheet, each film being held by a separate suspension element. The suspension element may also comprise a single length of adhesive release tape comprising the first strip to hold more than one sheet of film or plastic envelope stuck onto the adhesive surfaces of respectively separate second strips.

Thus, in accordance with this invention, it is possible to mount several suspension elements on a single base sheet to form a suspension file. This can be accomplished by either having individual suspension element (i.e., each set of adhesive and respective release strips) spaced at intervals from one another, or having one long suspension element comprising a length of second strip overlap a length of first strip.

BRIEF DESCRIPTION OF THE DRAWINGS

The present invention will be more fully understood and appreciated from the following detailed description taken in conjunction with the drawings, in which.

DETAILED DESCRIPTION OF THE INVENTION

The present invention relates to a suspension system for plastic sheet material and a suspension element for use in the suspension system. For purposes of the present invention, the term "plastic sheet material" is intended to include all sheet material that has a smooth surface releasably attachable to an adhesive strip and that is resistant to tearing when such an adhesive strip is pulled off therefrom. Such sheets include, but are not limited to, films, sheeting formed of rigid and semi-rigid polymers, such as polyethylene, polypropylene, polyester, nylon, as well as thin methal sheets.

The suspension system includes a base sheet made of plastic or other suitable material, and a suspension element attached thereto. Suitable material for the base sheet includes any material having a rigid surface to which a suspension element can adhere, including plastics, paper, cardboard, wood, glass, and even some textiles. Preferably, the base sheet is associated with a hanging element for storing the suspension system in a file cabinet or other conventional filing location. However, a wall can also serve as a suitable base sheet for the suspension elements of this invention.

Figure 1:
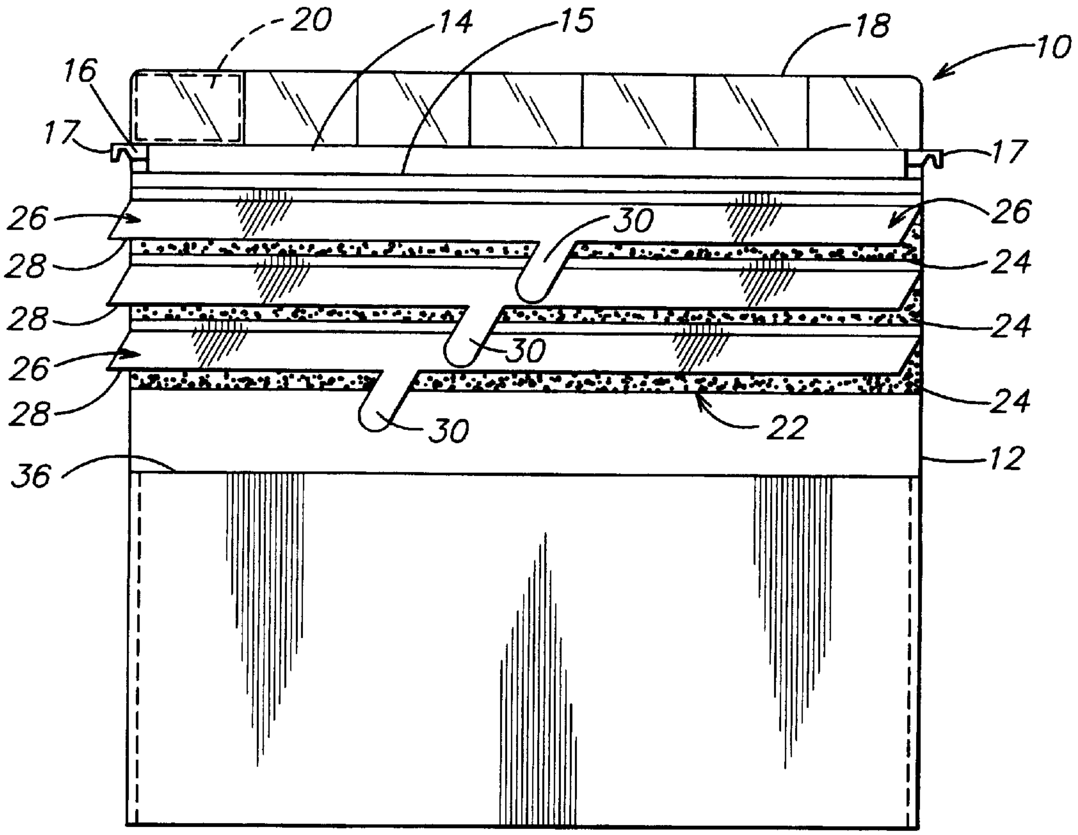
FIG. 1 is a plan view of a suspension file in accordance with one embodiment of the present invention.
Figure 2:
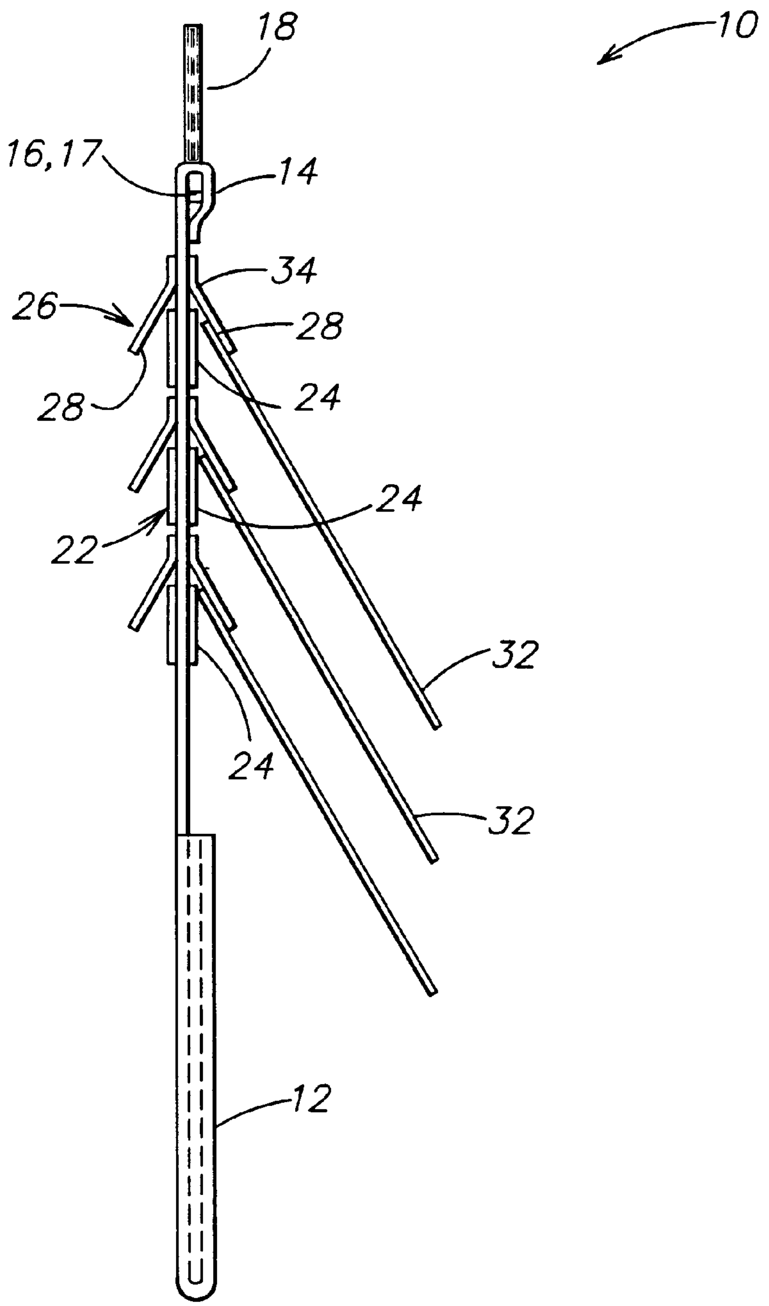
FIG. 2 is a side view of a suspension file in accordance with the present invention.

Referring now to FIGS. 1–2, there is shown a suspension file 10 comprising a sheet of plastic material 12 having a sleeve 14 on its upper end, which sleeve can be made by folding the sheet material 12 over itself and heat sealing it 15 at its lower edge. Alternatively, a separate piece of plastic can be heat sealed onto the sheet 12 to form the sleeve 14. Through the sleeve 14 there is inserted a suspension rod 16 with terminal hooks 17 adapted for hanging over suitable rods in a filing cabinet. The suspension file 10 is also provided with indexing means 18 which may provide pockets 20 for inserting removable labels. Suspension elements formed of first adhesive strips 22 and second adhesive strips 26 are affixed to suspension file 10. First adhesive strips 22, which may be strips of tape, having adhesive surfaces on one side and adhesive release surfaces 24 on the other side, are affixed to the plastic sheet 12 with the adhesive release surfaces 24 exposed. Second adhesive strips 26, which may be adhesive tapes, are mounted on plastic sheet 12, with the adhesive surfaces 28 partly overlapping the adhesive release surfaces 24, enabling the adhesive surfaces 28 of strips 26 to be easily lifted from the release surfaces 24. To help lift the strips 26 from the adhesive surfaces 24, tabs 30 are attached to the adhesive strips 26. Sheets of film 32, when placed between the adhesive surfaces 28 of strip 26 and the adhesive release surfaces 24, adhere to the adhesive strips 26, and become hingedly attached 34 to the plastic sheet 12. Films 32 can therefore be pivoted and viewed without having to be removed from the suspension file 10. As shown in FIG. 1, the plastic sheet material 12 may comprise a pocket 36 which may hold regular paper, such as reports, comments or instructions regarding films stored in the file 10.

Figure 3:
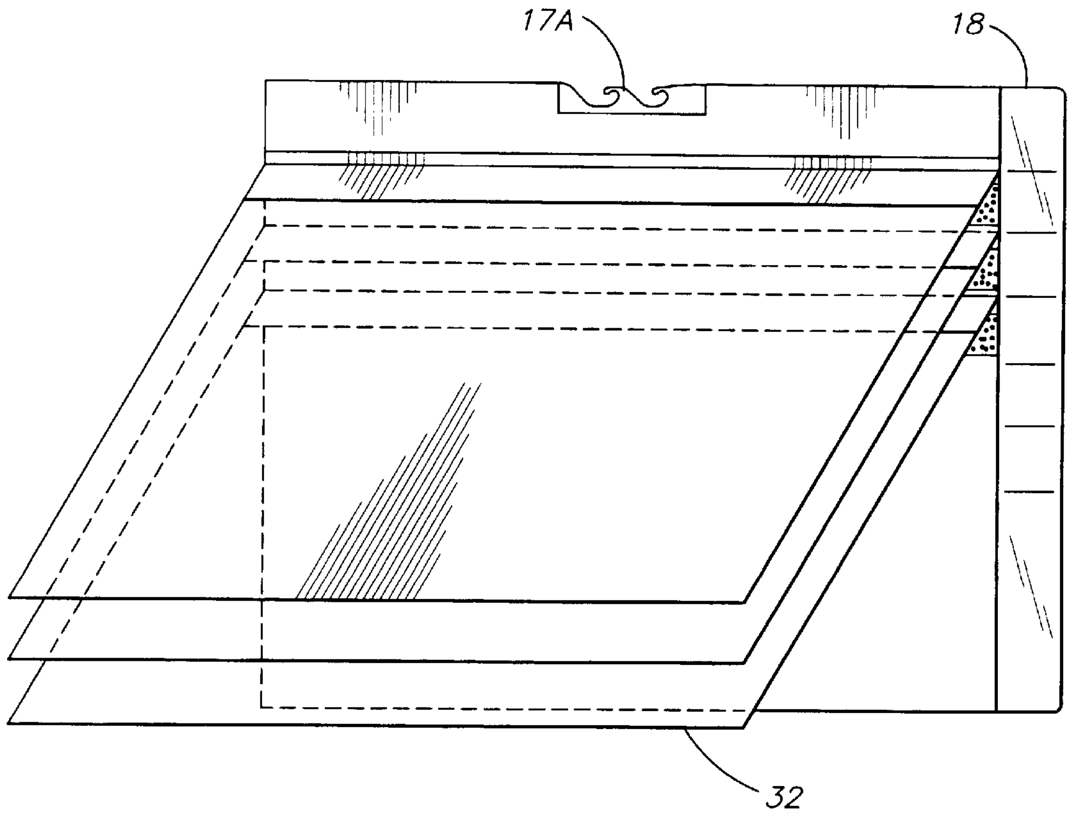
FIG. 3 illustrates another embodiment of a suspension file in accordance with the invention.

In another embodiment of the invention shown in FIG. 3, the suspension means 17A are adapted for a filing system based on adjacent parallel suspension rods. In the embodiment shown in FIG. 3, the indexing means 18 are not on top of the file but rather on one side thereof. Films thus stored are readily browsed without removing from the file and can easily be found and identified.

Figure 4:
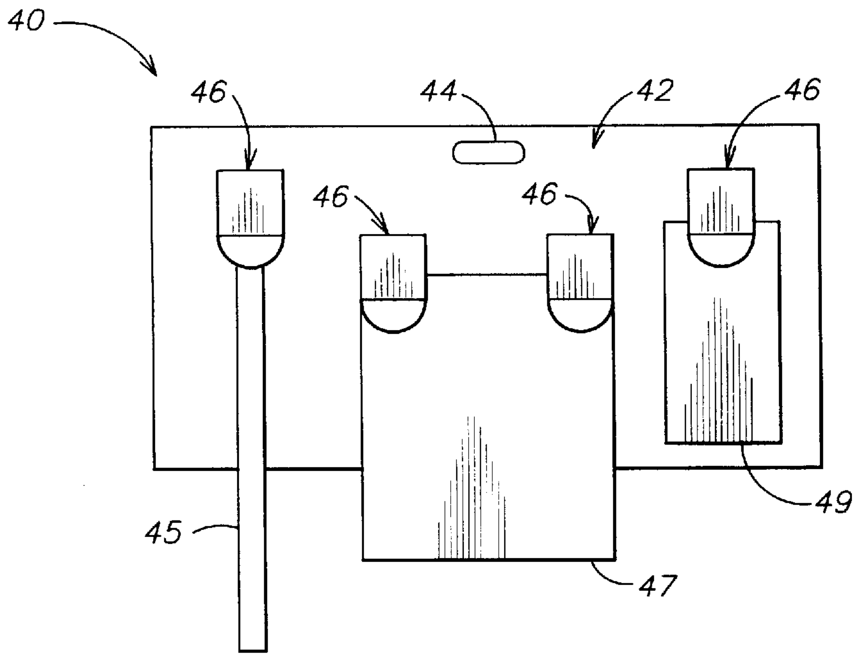
FIG. 4 is a plan view of another embodiment of a suspension file in accordance with the present invention.
Figure 5:
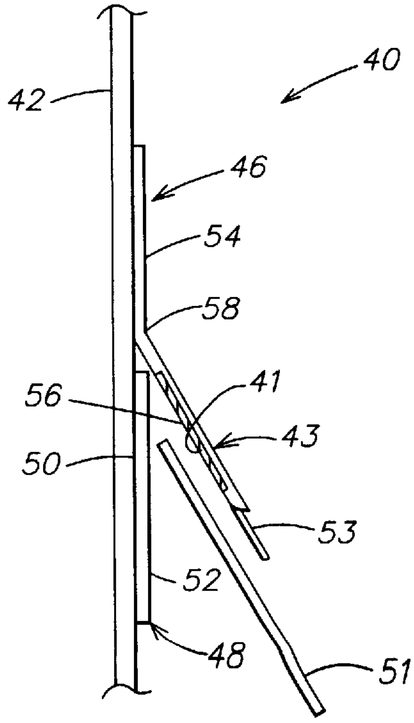
FIG. 5 is a side sectional view of an alternative embodiment of the suspension file of the present invention.

Referring to FIGS. 4 and 5 there is shown a suspension file in accordance with another embodiment of the present invention. Suspension file 40 includes a base sheet 42, here shown with associated suspension means 44. Sheet 42 can be formed of any suitable material to which suspension elements can be attached.

Suspension file 40 further includes a plurality of suspension elements 46 for releasably retaining plastic films 45, and/or sheet material 47, 49. Suspension elements 46 are substantially similar to those described and illustrated with reference to FIG. 1. The suspension elements 46 illustrated in FIG. 4 constitute individual patches. These can be of various sizes. Thus, elements 46 can be arranged in any desired order on base sheet 42, depending on the size and number of plastic films or sheets to be suspended thereon.

As shown in side view in FIG. 5, each element 46 consists of a first strip 48 and a second strip 54. The first strip 48 has an adhesive surface 50 on one side and an adhesive release surface 52 on the other side, and is affixed to sheet 42 with the adhesive release surface 52 exposed. The second strip 54 is mounted on sheet 42 above strip 48, and has an adhesive surface 56 hingedly 58 overlapping the adhesive release surface 52, enabling the adhesive surface 56 of strip 54 to be easily lifted from the release surface 52.

The second adhesive strip 54 of suspension elements 46 may alternatively have a semi-rigid or rigid hinged overlapping section 43. Overlapping section 43 could be formed, for example, by inserting or laminating a rigid or semi-rigid element 41 thereto to make it stiffer and easier to lift from the release surface 52 and from the plastic sheet material 51. To further help lift overlapping sections 43 from the adhesive release surfaces 52 and plastic sheet material 51, tab 53 may be attached to the end of the overlapping section 43. It will be appreciated that this embodiment is suitable for use with adhesive strips of any size or length, and these are not restricted to the dimensions illustrated in the drawings by way of example.

It will be appreciated by those skilled in the art that the invention is not limited to what has been shown and described hereinabove by way of example. Rather, the scope of the invention is defined solely by the claims which follow.

I claim:

1. A suspension system for storing and retrieving plastic sheets of a plastic sheet material comprising:

a base sheet;

a suspending element attached to said base sheet;

a first strip with an exposed adhesive release surface fixed to said base sheet;

a second strip having an adhesive surface hingedly mounted on said base sheet, said adhesive surface at least partially overlapping the exposed adhesive release surface of said first strip;

the adhesive surface able to releasably adhere to the plastic sheets; and the adhesive release surface preventing the adhesive surface from adhering permanently to the base sheet, thereby making the adhesive surface reusable;

whereby the plastic sheets can be repeatedly mounted on and removed from said base sheet for suspended storage and retrieval by releasably adhering the plastic sheets to the adhesive surface of the second strip.

2. A suspension system in accordance with claim 1, further comprising indexing means.

3. A suspension system in accordance with claim 1, further comprising tab means associated with said second strip for lifting said strip off said adhesive release surface of said first strip.

4. A suspension system in accordance with claim 1, wherein said base sheet or said sheet of plastic material comprises a pocket or envelope for holding documents.

5. A suspension system in accordance with claim 1, wherein said overlapping second strip is semi-rigid or rigid.

6. A suspension system in accordance with claim 1, wherein said overlapping second strip includes a rigid or semi-rigid liner elements.

7. A suspension system in accordance with claim 1, wherein the first and second strips have shapes selected from short patches and long strips.

8. A suspension file for storing and retrieving plastic sheet material comprising:

a base sheet;

a suspending element attached to said base sheet;

at least one first strip with an exposed adhesive release surface fixed to said base sheet;

at least one second strip having an adhesive surface hingedly mounted on said base sheet, the adhesive surface at least partially overlapping the exposed adhesive release surface of the at least one first strip;

said adhesive surface able to releasably adhere to the plastic sheet material; and said adhesive release surface preventing the adhesive surface from adhering permanently to the base sheet, thereby making the adhesive surface reusable;

whereby plastic sheets can be repeatedly mounted on and removed from said base sheet for suspended storage and retrieval by releasably adhering the plastic sheets to the adhesive surface of the second strip.

9. A suspension file in accordance with claim 8, further comprising indexing means.

10. A suspension file in accordance with claim 8, further comprising tab means associated with said strips of adhesive tapes for lifting said tapes off the adhesive release surface.

11. A suspension file in accordance with claim 8, wherein the base sheet of plastic material comprising the suspension file comprises a pocket or envelope for holding documents.

12. A method for storing and retrieving a plastic sheet in a suspension file system, comprising:

providing a suspension file comprising:

a base sheet, a suspending element attached to said base sheet, a first strip with an exposed adhesive release surface fixed to said base sheet;

a second strip having an adhesive surface hingedly mounted on said base sheet, said adhesive surface at least partially overlapping the exposed adhesive release surface of the first strip, said adhesive surface able to releasably adhere to the plastic sheet, and said adhesive release surface preventing the adhesive surface from adhering permanently to the base sheet making the adhesive surface reusable, whereby plastic sheets can be repeatedly mounted on and removed from the base sheet for suspended storage and retrieval by releasably adhering to the adhesive surface of the second strip;

inserting the plastic sheet between the first and second strips and pressing the adhesive surface against the plastic sheet to hingedly fasten same to the base sheet; and storing said plastic sheet in a suspension filing system.

* * * * *